United States Patent [19]

Tattersall

[11] Patent Number: 4,529,054
[45] Date of Patent: Jul. 16, 1985

[54] FLUID FLOW CONTROL SYSTEMS
[75] Inventor: Edward G. Tattersall, Southampton, England
[73] Assignee: Vosper Hovermarine Limited, Fed. Rep. of Germany
[21] Appl. No.: 539,524
[22] Filed: Oct. 6, 1983
[30] Foreign Application Priority Data Oct. 7, 1982 [GB] United Kingdom ............... 8228627

[51] Int. Cl.³ .............................................. B63B 1/36
[52] U.S. Cl. .................................. 180/118; 180/120; 180/126; 114/67 A
[58] Field of Search ............................... 180/121–127; 114/67 A

[56] References Cited

U.S. PATENT DOCUMENTS 4,029,036  6/1977  Magnuson ........................... 180/121
4,046,217  9/1977  Magnuson ........................... 180/126

FOREIGN PATENT DOCUMENTS 1471512  4/1974  United Kingdom .
1349676  4/1974  United Kingdom .
1487178  9/1977  United Kingdom .
2075936  1/1981  United Kingdom .

Primary Examiner—Joseph F. Peters, Jr.
Assistant Examiner—Donn McGiehan
Attorney, Agent, or Firm—Steele, Gould & Fried

[57] ABSTRACT

A fluid flow control system for connecting a source of pressurized fluid with a region of varying pressure, comprises a fluid supply duct having an inlet end connectable to the pressure source end and an outlet end connectable to the region of varying pressure, a vent duct disposed between the inlet and outlet ends, and a vent valve sensitive to change in pressure within the supply duct and operable so as to control the escape of fluid from the supply duct. The vent valve preferably comprises a flexible wall member of hollow, inflatable form. In operation of the system, a relatively small amount of fluid is allowed to escape when pressure at or adjacent the outlet end of the supply duct is substantially less than that at or adjacent the inlet end thereof, and a relatively large amount of fluid is allowed to escape when the pressure differential is reversed. The system is particularly useful as a "ride" control for gas-cushion vehicles operating over rough ground or water.

9 Claims, 3 Drawing Figures

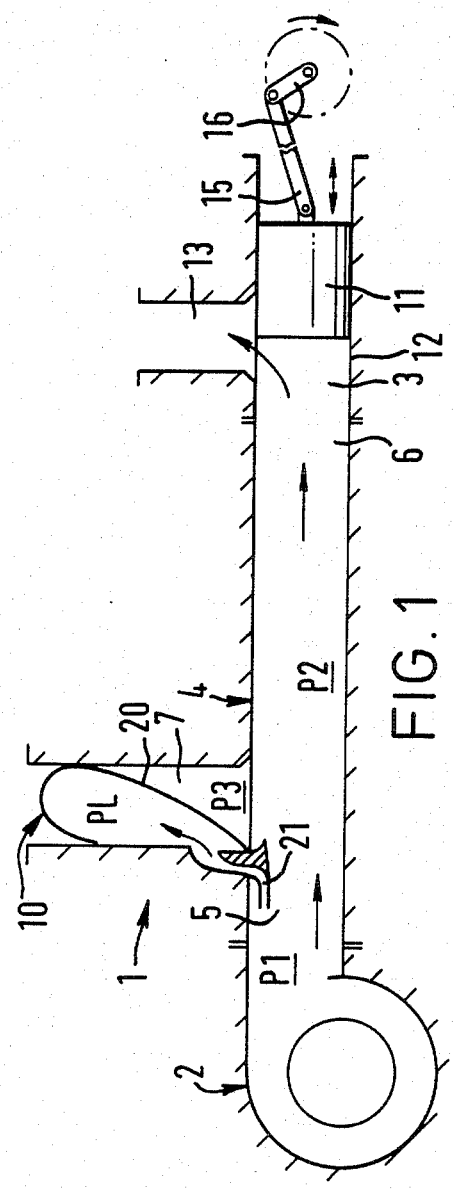
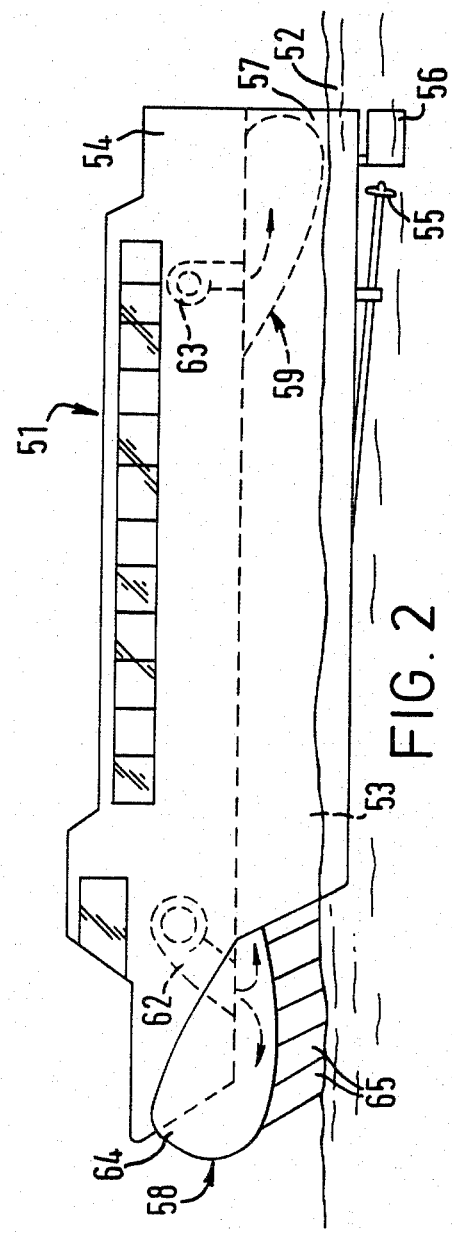

FLUID FLOW CONTROL SYSTEMS

BACKGROUND TO THE INVENTION

This invention relates to fluid flow control systems, and is concerned with fluid control systems for connecting a source of pressurized fluid with a region of varying pressure.

SUMMARIES OF THE PRESENT INVENTION

According to the invention, a fluid flow control system for connecting a source of pressurised fluid with a region of varying pressure, comprises fluid supply duct of elongate form, having an inlet and connectable to the pressure source and outlet end connectable to the region of varying pressure, a vent duct disposed between the inlet and outlet ends, and vent valve means sensitive to change in pressure within the supply duct and operable so as to control the escape of fluid from the supply duct, whereby a relatively small amount of fluid is allowed to escape when pressure at or adjacent the outlet end of the supply duct is substantially less than that at or adjacent the inlet end thereof, and a relatively large amount of fluid is allowed to escape when the pressure differential is reversed.

The relatively small amount of fluid may be zero.

The invention is particularly, but not exclusively, suited to gas-cushion vehicles, that is to say, to vehicles for travelling over a surface and which, in operation, are supported above that surface, at least in part, by a cushion of pressurised gas, for example, air, formed and contained between the vehicle body and the surface.

When a gas-cushion vehicle travels over an undulating surface such as rough water or ground, it experiences changes in volume and gas flow and thereby dynamic variations in the pressure of the vehicle-supporting cushion. These variations, unless reduced, result in the application of undesirable forces to the vehicle.

According to a particular aspect of the present invention, therefore, a gas-cushion vehicle is provided with means for reducing dynamic variations in cushion gas pressure, said means comprising the aforesaid fluid flow control system wherein the fluid supply duct connects a space occupied by cushion gas with a cushion gas supply source and the vent duct connects the supply duct with the atmosphere, or another region of lower pressure, the vent valve means comprising a flexible wall member disposed within the vent duct and operable so as to allow cushion gas to escape to the atmosphere as cushion pressure tends to increase, and to impede the escape of cushion gas as cushion pressure tends to decrease.

The system provides the gas-cushion vehicle with improved "ride" quality.

The space occupied by cushion gas is preferably the cushion space beneath the vehicle body but it may also be, for example, a chamber spaced from, but in direct communication with, the cushion space.

The flexible wall member thus provides a flexible barrier maintaining a pressure differential between the sapce occupied by cushion gas and the atmosphere.

BRIEF DESCRIPTION OF THE DRAWINGS

The invention will now be decribed, by way of example only, with reference to the accompanying drawings, wherein:

FIG. 1 illustrates the invention in a semi-diagrammatic manner,

FIG. 2 is a side view of a sidewall gas-cushion vehicle, and

In the Figures, like reference numerals refer to like components and features.

DETAILED DESCRIPTION OF THE INVENTION

Figure 3:
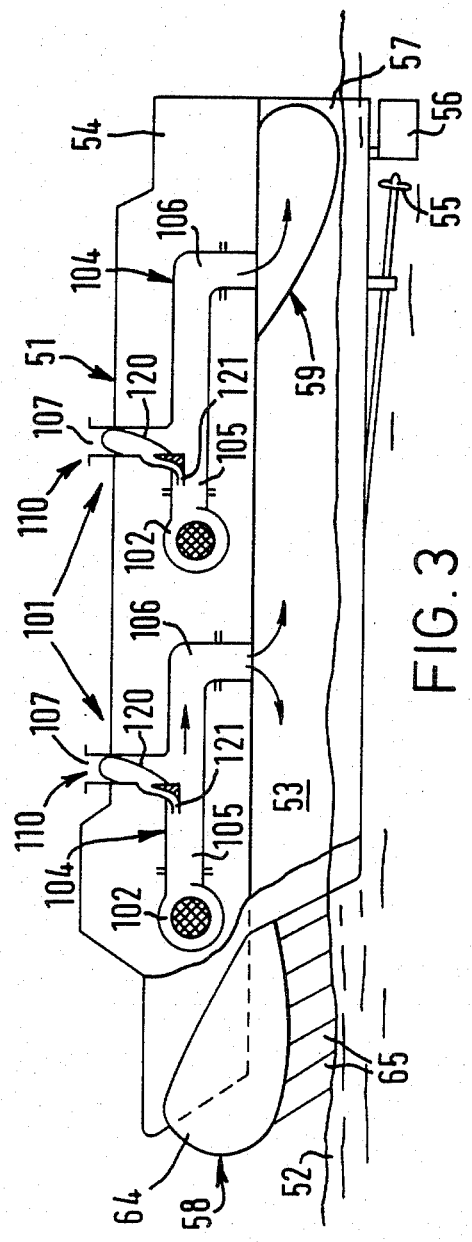
FIG. 3 is another side view, partly in medial section, illustrating a modification of the vehicle of FIG. 2, made in accordance with the invention.

With reference to FIG. 1, a fluid flow control system 1 for connecting a source of pressurised fluid (provided by centrifugal air fan 2), with a region 3 of varying pressure, comprises a fluid supply duct 4 of elongate form. The supply duct 4 has an inlet end 5 connected to the outlet of the fan 2 and an outlet end 6 connected to the varying pressure region 3. A vent duct 7 leading to atmosphere or another region of lower pressure is disposed between the inlet and outlet ends 5, 6. Vent valve means 10 sensitive to changes in pressure within the supply duct 4 operate so as to control the escape of fluid from the supply duct, whereby a relatively small amount of fluid, (which may be substantially zero), is allowed to escape to atmosphere when pressure at the outlet end 6 is substantially less than that at the inlet end 5 thereof, and a relatively large amount of fluid is allowed to escape to atmosphere when this pressure differential is reversed.

In this example, the varying pressure in the region 3 is achieved by a piston 11 reciprocally movable within a cylinder 12 by rod (15) and crank (16) means. The cylinder 12 is provided with an outlet duct 13. Reciprocating movement of the piston 12 results in cyclic variation in pressure in region 3.

The vent valve means 10 comprise a flexible wall member 20 of hollow, inflatable form. The wall member 20 is inflated by air flowing through a "pitot" tapping 21 connecting inlet end 5 of the supply duct 4 with the interior of the member 20. Alternatively, the wall member 20 could be inflated by independent means. For example, a fan or the like. The plane of entry of the tapping 21 is disposed substantially normal to the direction of flow entering inlet end 5.

The pressure conditions in various parts of the flow control system 1 are indicated by P1, P2, P3 and PL. PL is a static pressure.

In the pressure-balance condition illustrated by FiG. 1, PL is substantially greater than P3, whereby the wall member 20 seals-off the vent duct 7 by light contact therewith.

If P3 becomes substantially greater than PL, for example, as a result of backflow along the supply duct 4, the pressure differential across the member 20 decreases. This results in deflation of the member, whereby air escapes to atmosphere by way of the vent duct 7, until a pressure balance is restored.

The invention results in the attenuation of large pressure variations downstream of the valve means 10.

DETAILED DESCRIPTION OF THE PREFERRED EMBODIMENT

With reference now to FIG. 2, a sidewall gas-cushion vehicle 51 is shown travelling over the surface 52 of water, supported by a cushion 53 of pressurised gas (air), formed and contained between the body 54 and the surface 52. The vehicle 51 is propelled by a pair of waterscrew propellers 55 and is steered by a pair of rudders 56.

The sides of the vehicle-supporting cushion 53 are contained by a pair of laterally-spaced sidewall structures 57 extending longitudinally along the sides of the vehicle body 54 in substantially parallel array. The sidewalls 57 depend from the sides of the vehicle body 54 so as to dip into the water and form a cushion seal. Each sidewall 57 carries a waterscrew propeller 55 and a rudder 56.

The front or bow end of the cushion 3 is contained by a flexible skirt 58 and the rear or stern end thereof by a flexible skirt 59. The skirts 58, 59, which are of hollow, inflatable form, and constructed from rubberised fabric, extend laterally between (and in the case of the skirt 58, beyond as well) the front and rear ends of the sidewalls 57. The skirts 58, 59 are attached to the vehicle body 54 and depend therefrom. The flexible skirt 58 is in light contact with the water surface 52. The inflation and tension forces set up in the flexible skirt 59 ensure that it is maintained clear of, but in close proximity to, the surface 52.

The front flexible skirt 58 is of two-stage form. The upper stage comprises a flexible loop 64. The lower stage comprises a succession of independently-deflectable flexible wall or skirt members 65 attached to and depending below the loop 64. The skirt members 65 are of the form disclosed by British Specification No. 1,043,351. (U.S. Pat. No. 3,420,330 of Bliss corresponds).

Air forming the vehicle-supporting cushion 53 is provided by a pair of centrifugal fans 62, disposed side by side which discharge directly into the spce occupied by the cushion 53. Cushion air then enters the loop 64 and skirt members 65 so as to inflate them. The rear flexible skirt 59 is inflated by air supplied by a centrifugal fan 63. The fans 62 and fan 63, which have side-disposed atmospheric air intakes, form separate means for supplying air to the space occupied by the vehicle-supporting cushion 53 and the skirt 59 respectively.

The fans 62, 63 are driven by variable-speed motors (not shown), under the control of the pilot of the vehicle.

In the modification illustrated by FIG. 3, the vehicle 51 is provided with two separate fluid flow control systems 101, each employing a single fan 102 which may replace fans 62 and 63 of FIG. 2. Each system 101 corresponds substantially to a system 1 of FIG. 1.

In each system 101, a relatively small amount of air is allowed to escape from the supply duct 104 when pressure adjacent the outlet end 106 of the duct is substantially less than that adjacent the inlet end 105 thereof, and a relatively large amount of air is allowed to escape when the pressure differential is reversed.

The forward system 101 of FIG. 3 operates to control the flow of pressurised air forming the vehicle-supporting cushion 53 and inflating the flexible skirt 58. The aft system 101 operates to control the flow of pressurised air to the rear skirt 59, i.e. skirt inflation control.

The forward system 101 of FIG. 3 ensures that large pressure fluctuations downstream of the valve means 110 may be attenuated. Fluctuating resistant pressure is produced in the air cushion 53 when the vehicle 51 moves through waves. Since the vehicle's motion in the vehicle plane varies with cushion pressure fluctuations, the system 101 results in improvement of the ride quality of the vehicle. If the valve means 110 is normally set in the closed position it would relieve excess back pressure only. If the valve means 110 is normally set in a partial open position it also sets to offset a decreasing pressure which could also occur in a cyclic pressure fluctuation.

The invention is not restricted to sidewall gas-cushion vehicles. It may also be applied to amphibious peripheral skirted vehicles.

Furthermore, the invention is not restricted to flow control of air and gases. It may also be used for flow control of liquids, for example, hydraulic systems.

The "simple loop" form of flexible wall member 20 may be replaced by a multi-stage wall member. For example, of the form disclosed by U.K. Pat. No. 1,448,390.

A wall member 20 need not be wholly flexible; it could incorporate stiffening so that it is made semi-flexible.

I claim:

1. A fluid flow control system for connecting a source of pressurised fluid with a region of varying pressure, comprising a fluid supply duct of elongate form, having an inlet end connectable to the pressure source and an outlet end connectable to the region of varying pressure, a vent duct disposed between the inlet and outlet ends, and vent valve means sensitive to change in pressure within the supply duct and operable so as to control the escape of fluid from the supply duct, whereby a relatively small amount of fluid is allowed to escape when pressure at or adjacent the outlet end of the supply duct is substantially less than that at or adjacent the inlet end thereof, and a relatively large amount of fluid is allowed to escape when the pressure differential is reversed.

2. A control system as claimed in claim 1, wherein the vent valve means comprise a flexible wall member disposed within the vent duct.

3. A control system as claimed in claim 1, wherein the vent valve means comprise a flexible wall member of hollow, inflatable form, disposed within the vent duct.

4. A gas-cushion vehicle provided with means for reducing dynamic variations in cushion gas pressure, and having a space occupied by cushion gas, said means for reducing dynamic variations comprising a fluid flow control system comprising a gas pressure source, a gas supply duct of elongate form, having an inlet end connected to the pressure source and an outlet end connected to the space occupied by cushion gas, a vent duct disposed between the inlet and outlet ends of the duct and vent valve means sensitive to change in pressure within the supply duct and operable so as to control the escape of gas from the supply duct, whereby a relatively small amount of gas is allowed to escape when pressure at or adjacent the outlet end of the supply duct is substantially less than that at or adjacent the inlet end thereof, and a relatively large amount of gas is allowed to escape when the pressure differential is reversed, the vent valve means comprising a flexible wall member disposed within the vent duct and operable so as to allow cushion gas to escape as cushion pressure tends to increase, and to impede the escape of cushion gas as cushion pressure tends to decrease.

5. A gas-cushion vehicle as claimed in claim 4, wherein the space occupied by cushion gas is the cushion space beneath the vehicle body.

6. A gas-cushion vehicle as claimed in claim 4, wherein the space occupied by cushion gas comprises a chamber spaced from, but in direct communication with, the cushion space.

7. A gas-cushion vehicle as claimed in claim 4, wherein the flexible wall member is of hollow, inflatable form.

8. A gas-cushion vehicle as claimed in claim 4, for operation over water, wherein the sides of the vehicle-supporting cushion are contained by a pair of laterally-spaced sidewall structures extending longitudinally along the sides of the vehicle body in substantially parallel array and depending from said sides so as to dip into the water and form a cushion seal.

9. A gas-cushion vehicle as claimed in claim 8, provided with a flexible skirt of hollow, inflatable form disposed between the sidewall structures so as to contain one end of the vehicle-supporting cushion, and further provided with two such control systems, one of which operates to control the flow of pressurised gas to form said cushion, and the other operates to control the flow of pressurised gas to inflate said flexible skirt.

* * * * *

UNITED STATES PATENT AND TRADEMARK OFFICE
CERTIFICATE OF CORRECTION

PATENT NO. : 4,529,054

DATED : July 16, 1985

INVENTOR(S) : Edward G. TATTERSALL

It is certified that error appears in the above-identified patent and that said Letters Patent is hereby corrected as shown below:

On the cover page, item 73, "Fed. Rep. of Germany" should be --England--

Signed and Sealed this

Twenty-second Day of July 1986

[SEAL]

Attest:

DONALD J. QUIGG

Attesting Officer  Commissioner of Patents and Trademarks